United States Patent
Wijaya et al.

(10) Patent No.: US 11,059,345 B2
(45) Date of Patent: Jul. 13, 2021

(54) STORAGE EVAPORATOR HAVING PHASE CHANGE MATERIAL FOR USE IN VEHICLE AIR CONDITIONING SYSTEM

(71) Applicant: Air International (US) Inc., Auburn Hills, MI (US)

(72) Inventors: Lim Wijaya, Auburn Hills, MI (US); Nickolaos Economou, Auburn Hills, MI (US)

(73) Assignee: Air International (US) Inc., Auburn Hills, MI (US)

( * ) Notice: Subject to any disclaimer, the term of this patent is extended or adjusted under 35 U.S.C. 154(b) by 120 days.

(21) Appl. No.: 16/129,873

(22) Filed: Sep. 13, 2018

(65) Prior Publication Data

US 2019/0016190 A1    Jan. 17, 2019

Related U.S. Application Data

(62) Division of application No. 14/726,494, filed on May 30, 2015, now Pat. No. 10,179,498.

(51) Int. Cl.
*F28D 20/02* (2006.01)
*B60H 1/00* (2006.01)
(Continued)

(52) U.S. Cl.
CPC ......... *B60H 1/005* (2013.01); *B60H 1/00335* (2013.01); *F28D 1/05391* (2013.01);
(Continued)

(58) Field of Classification Search
CPC ......... F28D 1/05391; F28D 2020/0008; F28D 2020/0013; F28D 2021/0085; F28D 20/02
See application file for complete search history.

(56) References Cited

U.S. PATENT DOCUMENTS 6,843,311 B2 * 1/2005 Evans .................... F28D 9/005
165/109.1
7,718,246 B2 * 5/2010 Strauss ................. F28F 13/003
428/118
(Continued)

FOREIGN PATENT DOCUMENTS

GB       2039022 A  *  7/1980  ................ F28B 1/06
JP    2000-205777    *  7/2000  ........... F28D 1/0333

OTHER PUBLICATIONS

Machine Translation of JP 2000-205777; Espacenet, Description; Jul. 2000; Yoshihiro et al.*

*Primary Examiner* — Filip Zec

(57) ABSTRACT

A storage evaporator for an air conditioning system in a vehicle is provided that includes phase change material-containing tubes arranged side-by-side in contact with refrigerant-containing tubes. The storage evaporator includes an upper coolant tank, a lower coolant tank, refrigerant-containing tubes fluidly connecting said tanks, and phase change material-containing tubes provided in contact with said refrigerant tubes. The refrigerant tubes have flat sides and the phase change material-containing tubes have flat sides. The flat sides of the refrigerant tubes are attached to the flat sides of said phase change material-containing tubes. The phase change material may be any of several materials and may an eutectic, a salt hydrate, and an organic material. In operation, cold energy is stored in the phase change material when the air conditioning compressor is in its "On" position. This cold energy is released from the phase change material when the compressor is in its "Off" position.

20 Claims, 8 Drawing Sheets

(51) Int. Cl.
*F28D 1/053* (2006.01)
*F28F 1/12* (2006.01)
*F28D 21/00* (2006.01)
*F28D 20/00* (2006.01)

(52) U.S. Cl.
CPC .............. *F28D 20/02* (2013.01); *F28F 1/126* (2013.01); *F28D 2020/0008* (2013.01); *F28D 2020/0013* (2013.01); *F28D 2021/0085* (2013.01); *F28F 2215/06* (2013.01); *Y02E 60/14* (2013.01)

(56) References Cited

U.S. PATENT DOCUMENTS

| | | | | |
|---|---|---|---|---|
| 9,555,687 | B2* | 1/2017 | Lim | F28D 20/02 |
| 2002/0043362 | A1* | 4/2002 | Wilson | F28D 9/0068 |
| | | | | 165/166 |
| 2010/0065244 | A1* | 3/2010 | Yokoyama | B60H 1/005 |
| | | | | 165/10 |
| 2010/0223949 | A1* | 9/2010 | Higashiyama | F25B 39/022 |
| | | | | 62/519 |
| 2010/0307180 | A1* | 12/2010 | Yamada | F25D 19/00 |
| | | | | 62/285 |
| 2017/0276419 | A1* | 9/2017 | Jeong | F28D 9/0037 |

\* cited by examiner

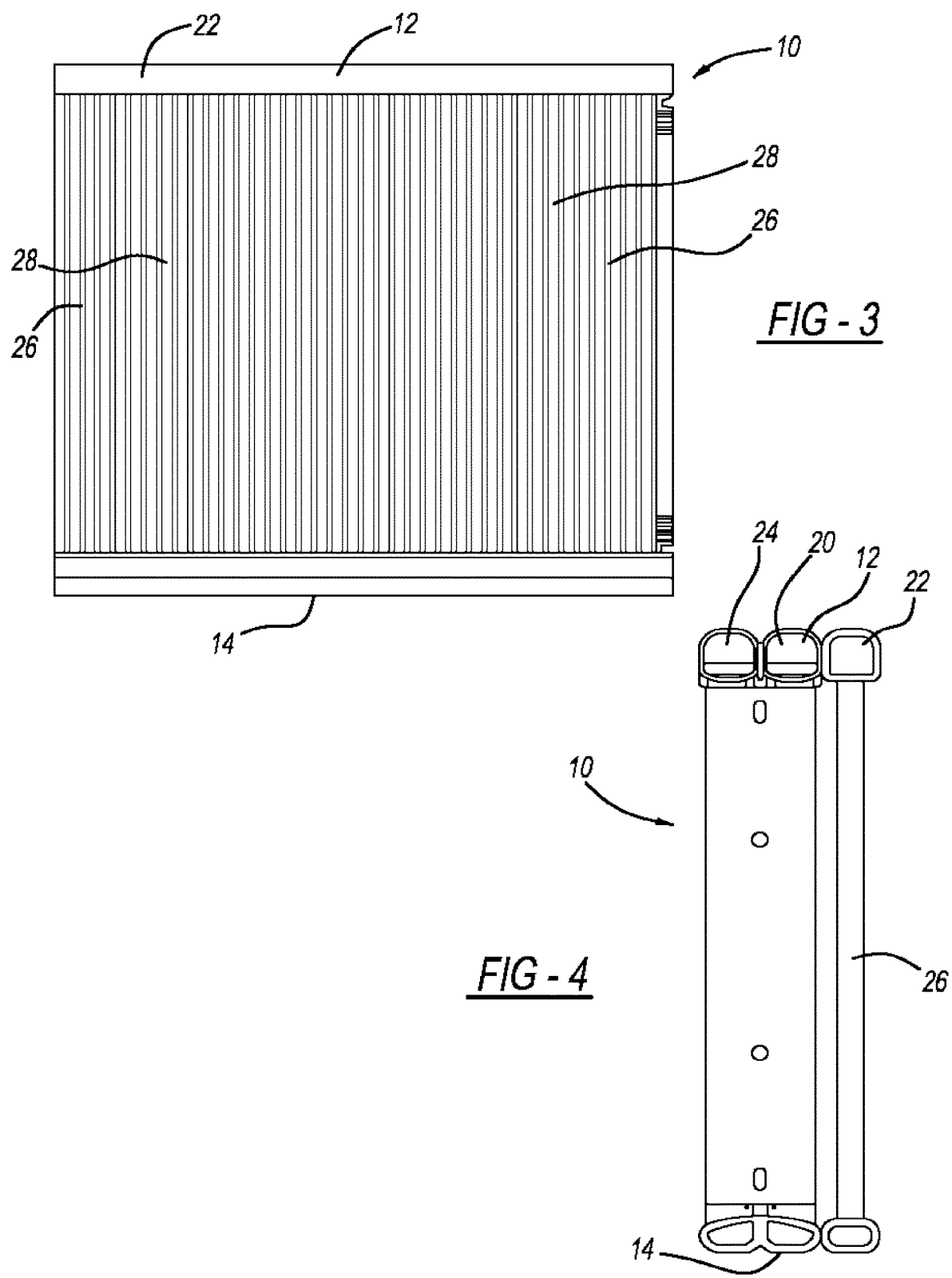

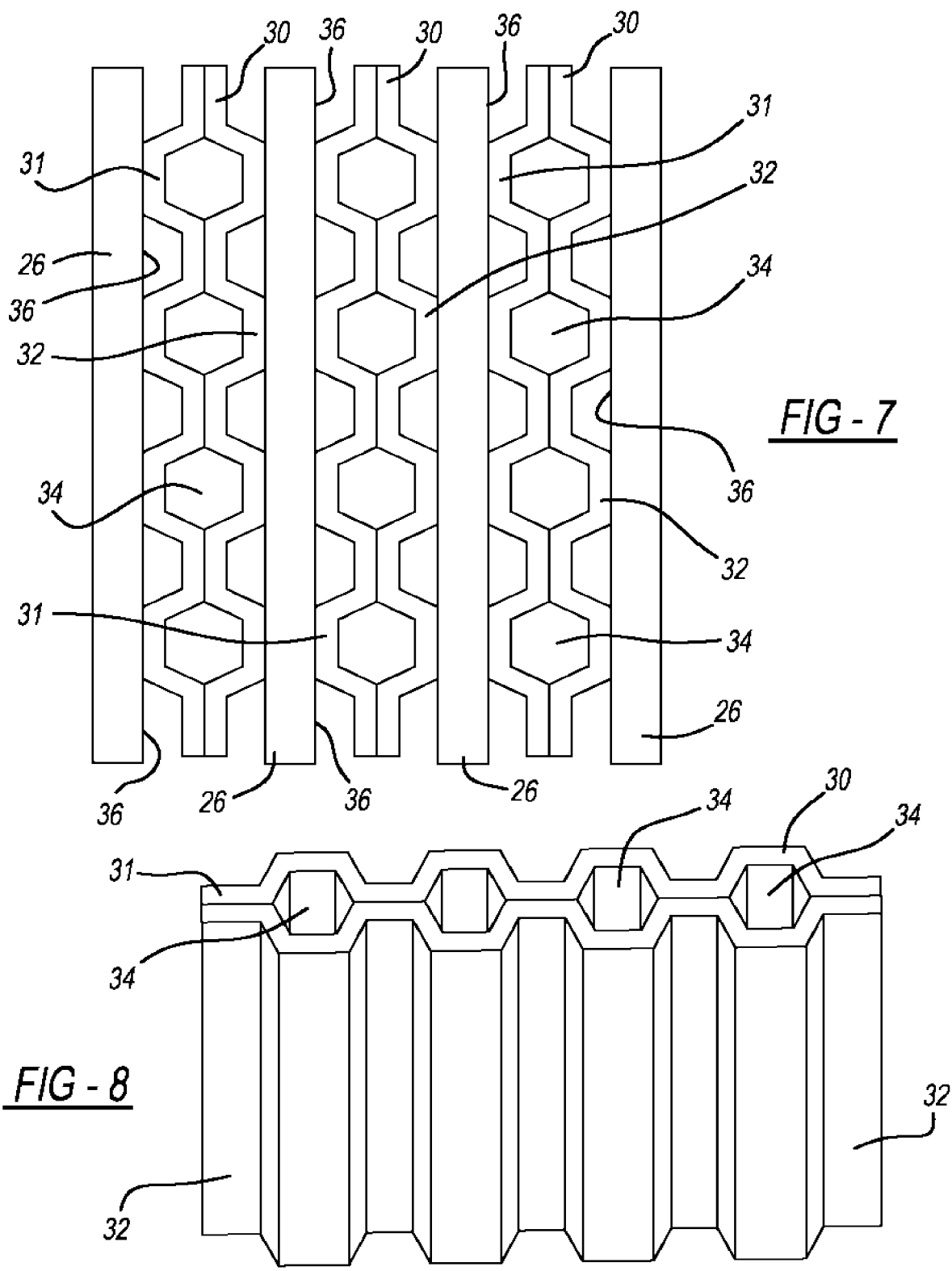

STORAGE EVAPORATOR HAVING PHASE CHANGE MATERIAL FOR USE IN VEHICLE AIR CONDITIONING SYSTEM

CROSS-REFERENCE TO RELATED APPLICATION

This application is a divisional application which claims the priority benefit of co-pending U.S. Non-Provisional patent application Ser. No. 14/726,494, filed May 30, 2015, for "Storage Evaporator Having Phase Change Material For Use In Vehicle Air Conditioning System," now U.S. Pat. No. 10,179,498, the entire disclosure of which, including the drawing, is hereby incorporated by reference.

TECHNICAL FIELD

The disclosed inventive concept relates to air conditioning systems for vehicles that utilize an evaporator. More particularly, the disclosed inventive concept relates to an evaporator for an air conditioning system for a vehicle that has air conditioning tubes that contain refrigerant and air conditioning storage tubes that contain a phase change material. The air conditioning storage tubes are fin-shaped and are physically connected to the refrigerant tubes. The storage tubes may be added to one side of a generally conventional fin and tube evaporator or may be incorporated into the evaporator.

BACKGROUND OF THE INVENTION

Most vehicles today include air conditioning systems to provide for improved occupant comfort. While being first introduced in the automotive world several decades ago, air conditioning systems have changed little. Thus the fundamental parts of the modern vehicle's air conditioning system are known and understood. These parts include the compressor, the condenser, the evaporator, the thermal expansion valve, and the drier or accumulator. In many ways the compressor is the heart of the vehicle's air conditioning system. The compressor pressurizes hot gaseous refrigerant and forces it on to the condenser. The condenser, which is like a small radiator, cools the hot gases received from the compressor. As these gases cool, they become liquid in the condenser.

Liquid refrigerant leaves the condenser under high pressure and enters the drier or accumulator. The drier catches any liquid water that may inadvertently have entered the system. The liquid refrigerant, once cleared of any water, flows to the expansion valve which functions to remove pressure from the liquid refrigerant and literally allows it to expand. This reduction of pressure allows the liquid refrigerant to return to the vapor stage in the evaporator, the refrigerant's next stop.

The evaporator is also similar in shape and function to a small radiator. Typically the evaporator is fitted inside of the vehicle's passenger compartment in or around the instrument panel. The still-liquid refrigerant enters the evaporator under low pressure from the expansion valve. The liquid refrigerant vaporizes while absorbing heat from inside the car. Cold air is circulated within the passenger compartment by a fan that pushes air across the fins of the evaporator. Low pressure refrigerant, now in gaseous form, exits the evaporator and returns to the compressor where the cycle is repeated.

As fuel economy becomes an increasingly critical factor in the design of the automobile, many automobile manufacturers are equipping the engine with automatic start and stop technology. The start-stop technology enables the engine to be off while the vehicle is stopped, for example, at a stop light or in congested traffic. As some vehicles use mechanically belt-driven compressors to run the air conditioning system, the compressor will not function during the engine off time. Thus, an improvement in the air conditioning system components is required during the engine off time.

SUMMARY OF THE INVENTION

The disclosed inventive concept overcomes the problems encountered during the engine off time by providing a storage evaporator that includes phase change material-containing tubes arranged side-by-side and in contact with refrigerant-containing tubes. The phase change material-containing tubes themselves are fin-shaped. More particularly, the storage evaporator of the disclosed inventive concept includes an upper coolant tank, a lower coolant tank, refrigerant tubes fluidly connecting said upper and lower tanks, and phase change material-containing tubes provided in contact with said refrigerant tubes. The storage tubes and the tanks may be added to one side of a generally conventional fin and tube evaporator or may be incorporated into the evaporator itself.

The phase change material-containing tubes are disposed parallel with one another in a longitudinal direction. In addition, the phase change material-containing tubes may be attached to one another in the longitudinal direction. Attachment of the adjacent phase change material-containing tubes may be made by a strip.

The refrigerant tubes have flat sides and the phase change material-containing tubes have flat sides. The flat sides of the refrigerant tubes are attached to the flat sides of said phase change material-containing tubes. The phase change material-containing tubes have a cross-sectional shape. The shape may be multi-sided, and is preferably six-sided or four-sided.

The phase change material may be any of several materials. Preferably, but not exclusively, the phase change material is selected from the group consisting of an eutectic, a salt hydrate, and an organic material. The organic material is preferably, though not exclusively, selected from the group consisting of waxes, fatty acids, oils and polyglycols.

In operation, energy is stored in the phase change material when the air conditioning compressor is in its "on" position. This energy is released from the phase change material when the compressor is in its "off" position.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 3 is a front view of the storage evaporator of FIGS. 1 and 2;

FIG. 4 is an end view of the storage evaporator of FIGS. 1 and 2;

FIG. 7 is a sectional view of the phase change material-containing tubes and the refrigerant-containing tubes according to a second embodiment of the disclosed inventive concept in which the phase change material-containing tubes have a six-sided configuration;

FIG. 8 is a perspective view of a series of phase change material-containing tubes according to the second embodiment of the disclosed inventive concept;

DETAILED DESCRIPTION OF THE PREFERRED EMBODIMENT

Figure 1:
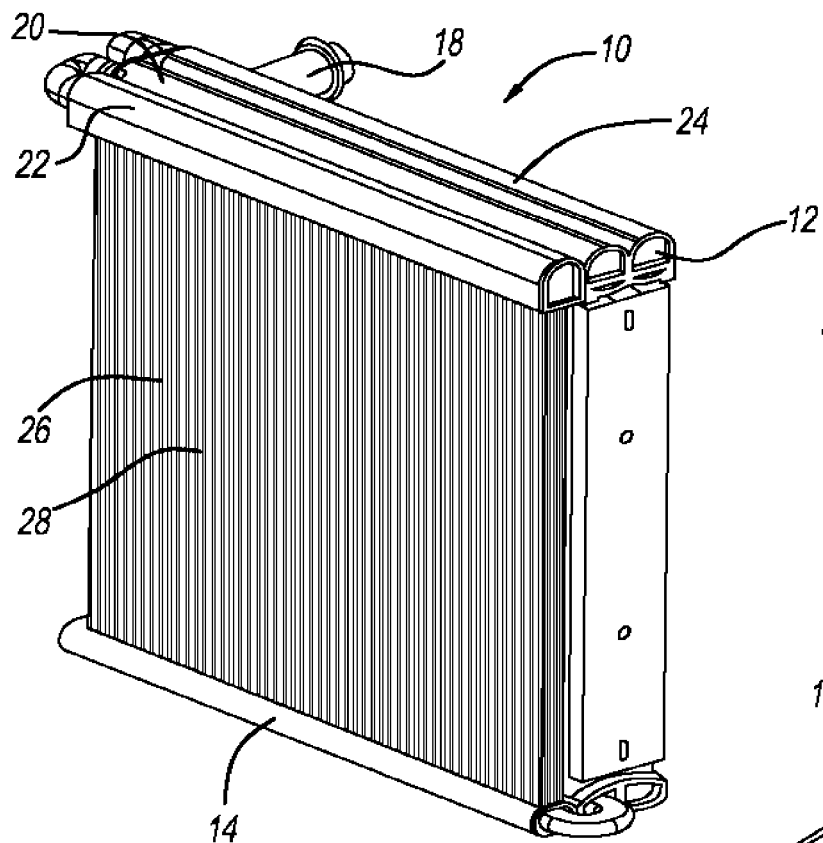
FIG. 1 is an isometric view of an add-on version of the storage evaporator according to the disclosed inventive concept that includes phase change material-containing tubes fitted adjacent refrigerant-containing tubes.

In the following figures, the same reference numerals will be used to refer to the same components. In the following description, various operating parameters and components are described for different constructed embodiments. These specific parameters and components are included as examples and are not meant to be limiting.

Figure 5:
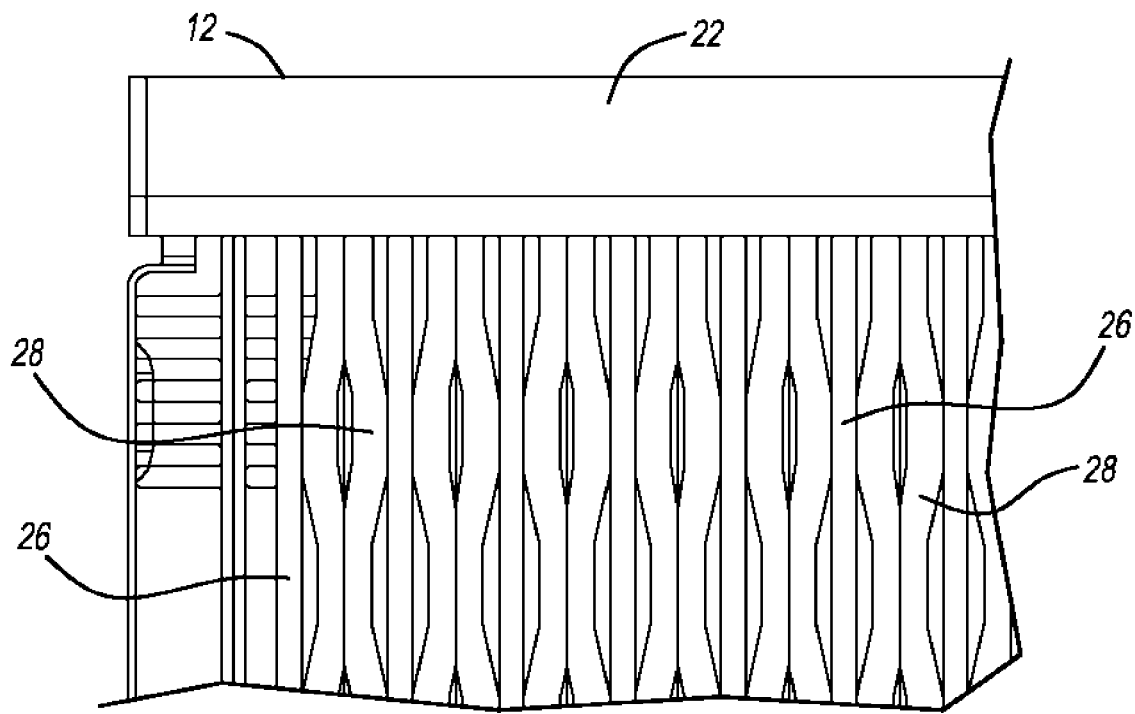
FIG. 5 is close-up view of a portion of the front view of the storage evaporator of the disclosed inventive concept illustrating the alternating, side-by-side placement of the phase change material-containing tubes and the refrigerant-containing tubes according to a first embodiment of the disclosed inventive concept.
Figure 6:
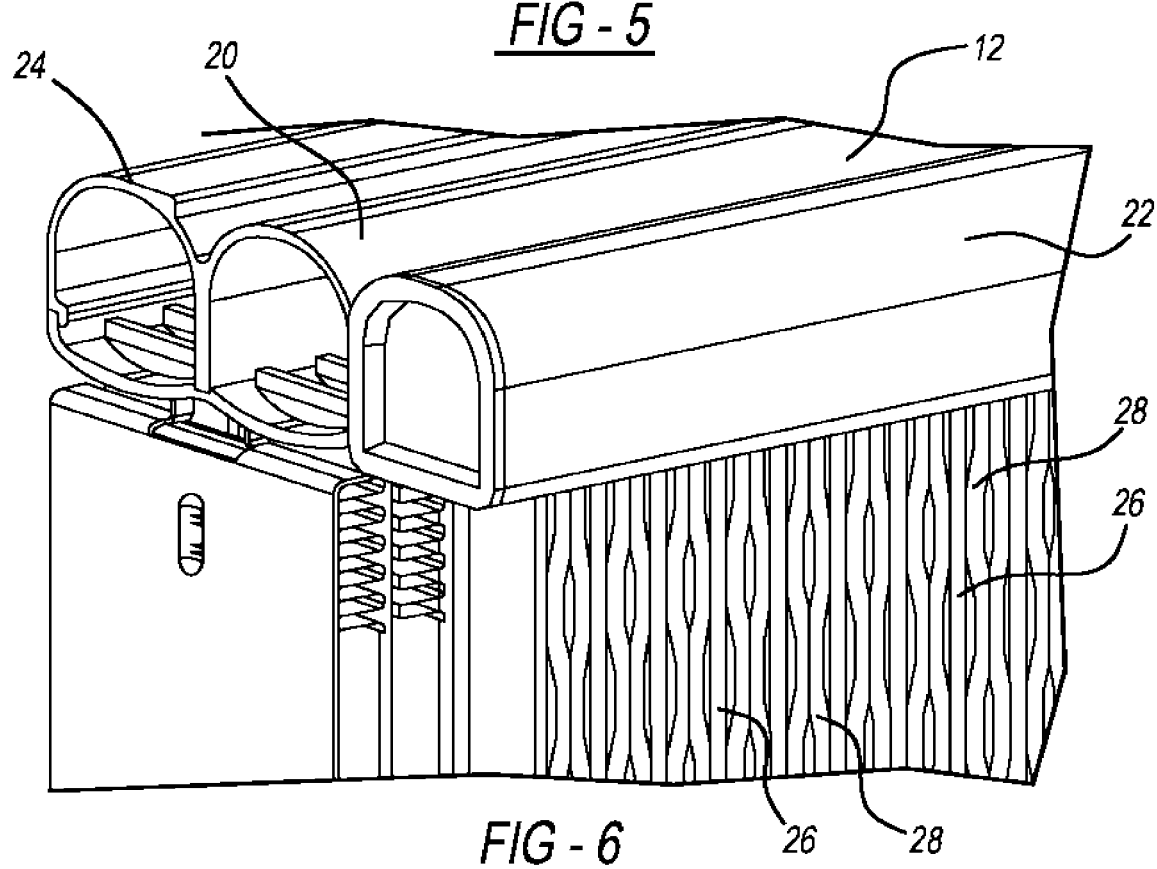
FIG. 6 is a perspective view of the portion of the storage evaporator illustrated in FIGS. 1 and 2.
Figure 9:
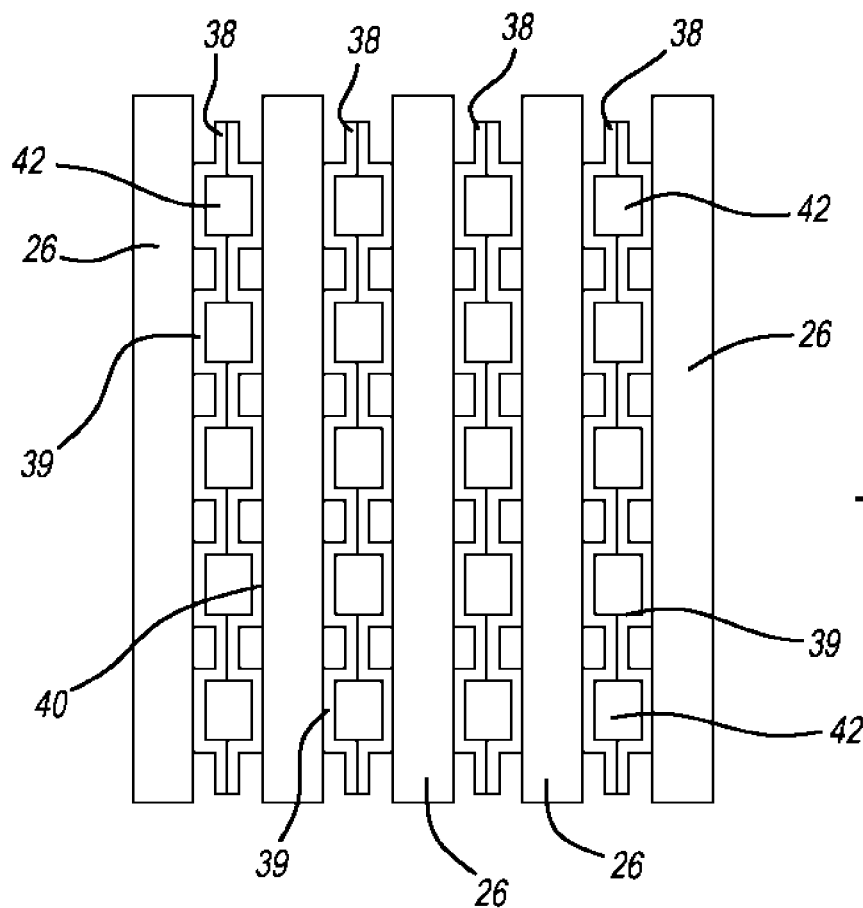
FIG. 9 is a sectional view of the phase change material-containing tubes and the refrigerant-containing tubes according to a third embodiment of the disclosed inventive concept in which the phase change material-containing tubes have a four-sided configuration.
Figure 10:
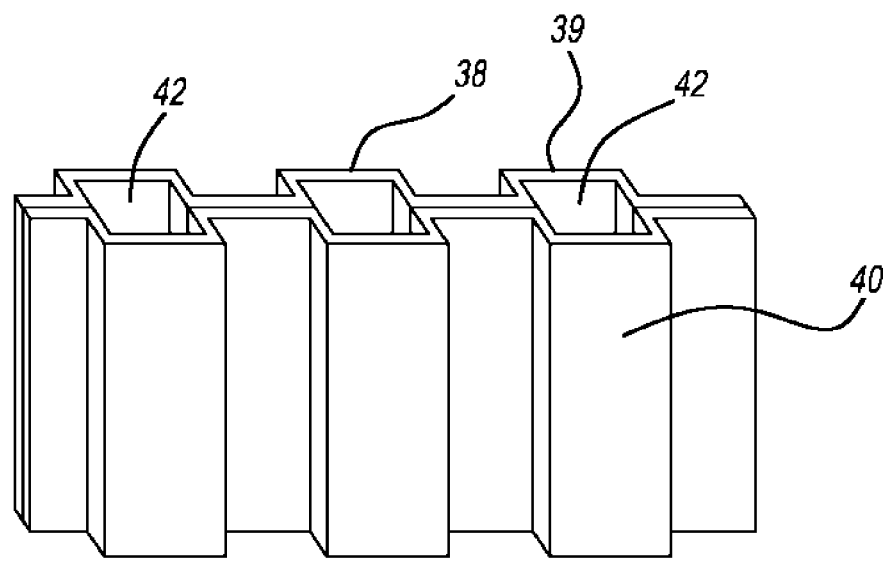
FIG. 10 is a perspective view of a series of phase change material-containing tubes according to the third embodiment of the disclosed inventive concept.
Figure 11:
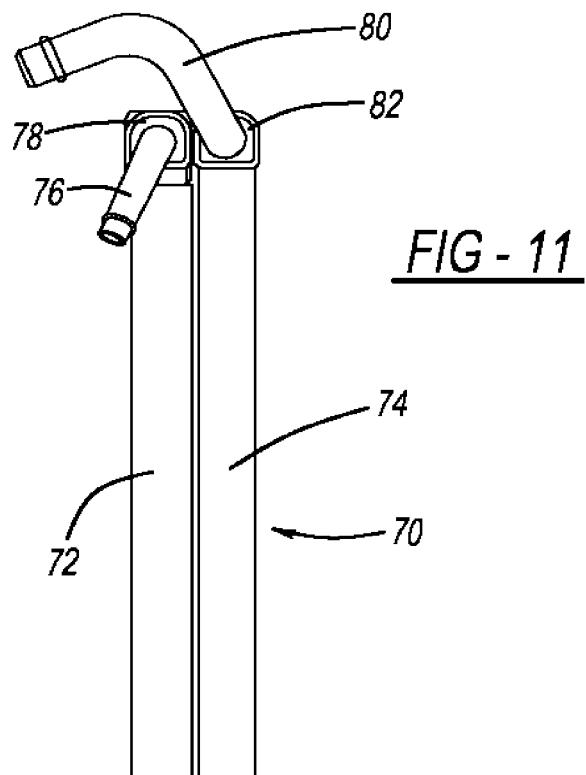
FIG. 11 is an end view of the integrated version of the storage evaporator according to the disclosed inventive concept that includes phase change material-containing tubes fitted adjacent refrigerant-containing tubes.
Figure 12:
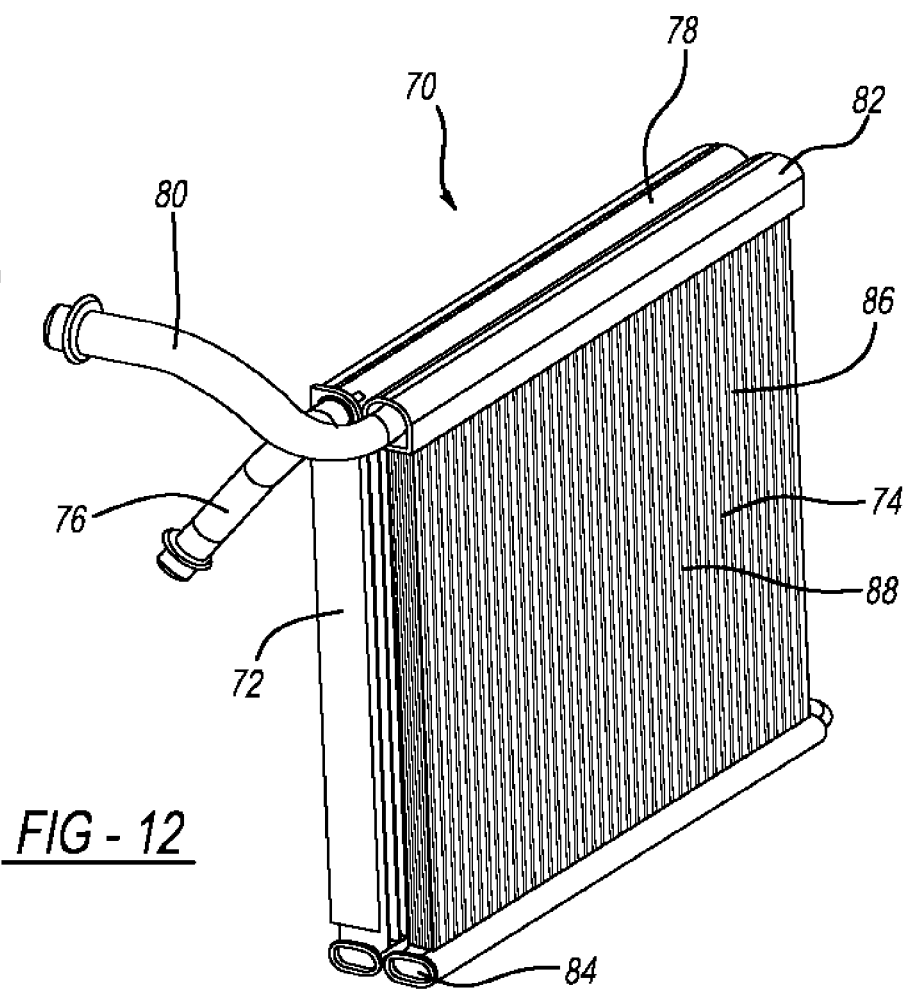
FIG. 12 is an isometric view of a storage evaporator of FIG. 11.
Figure 13:
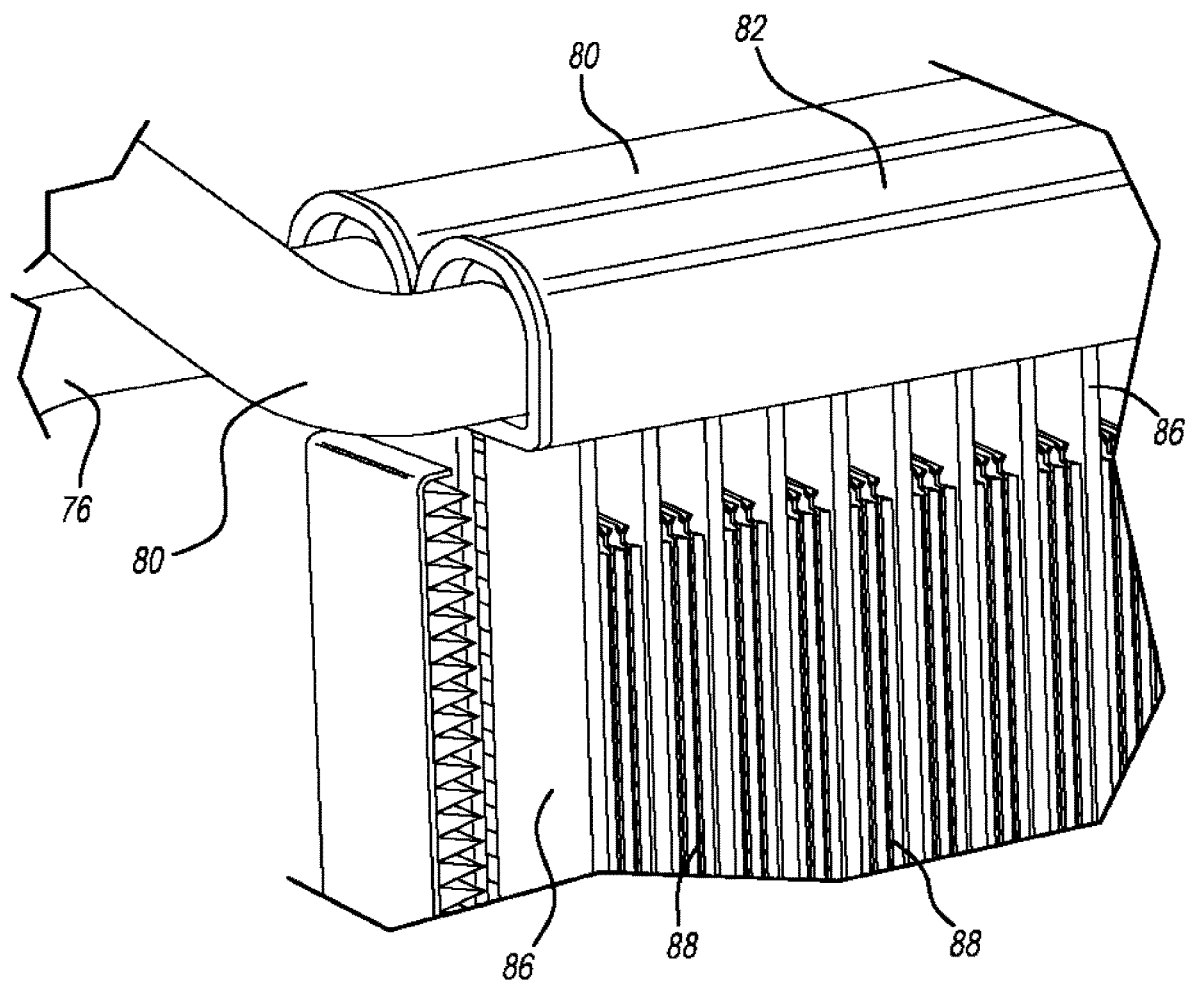
FIG. 13 is a perspective view of the portion of the storage evaporator illustrated in FIGS. 11 and 12.

The storage evaporator for use with an air conditioning system for a vehicle according to the disclosed inventive concept is illustrated in its various embodiments in FIGS. 1 through 10. However, it is to be understood that the illustrated embodiments are suggestive and are not intended as being limiting. The general arrangement of the add-on version of the disclosed inventive concept is illustrated in FIGS. 1 through 6. In FIGS. 5 and 6, a first embodiment of the phase change material-containing tubes is illustrated. An alternate embodiment of the phase change material-containing tubes is illustrated in FIGS. 7 and 8. A further alternate embodiment of the phase change material-containing tubes is illustrated in FIGS. 9 and 10. The general arrangement of the integrated version of the disclosed inventive concept is illustrated in FIGS. 11 through 13. Regardless of the embodiment, the storage evaporator of the disclosed inventive concept overcomes challenges and limitations associated with current evaporators during engine off time and thus still provides air conditioning to the cabin when the compressor is off.

The disclosed inventive concept includes the use of phase change material-containing tubes adjacent refrigerant-containing tubes. The phase change material may be any material that stores and releases thermal energy during the processes of melting and freezing. When a phase changing material freezes, it absorbs cold energy, thus providing cooling. This energy is referred to as latent heat of fusion or energy of crystallization. On the other hand, when phase change material melts, cold energy (cooling) of an equal amount is released, thus causing the physical change from a solid to a liquid.

Phase change materials include salts and organics. Salts include eutectic phase change materials that are salt solutions in water having phase change temperatures below 0° C. Salts also include types of salts that have phase change temperatures above 0° C. Organics include polymers made up of long chain molecules. These typically include carbon and hydrogen compounds. Specific examples include waxes, fatty acids, oils and polyglycols.

Figure 2:
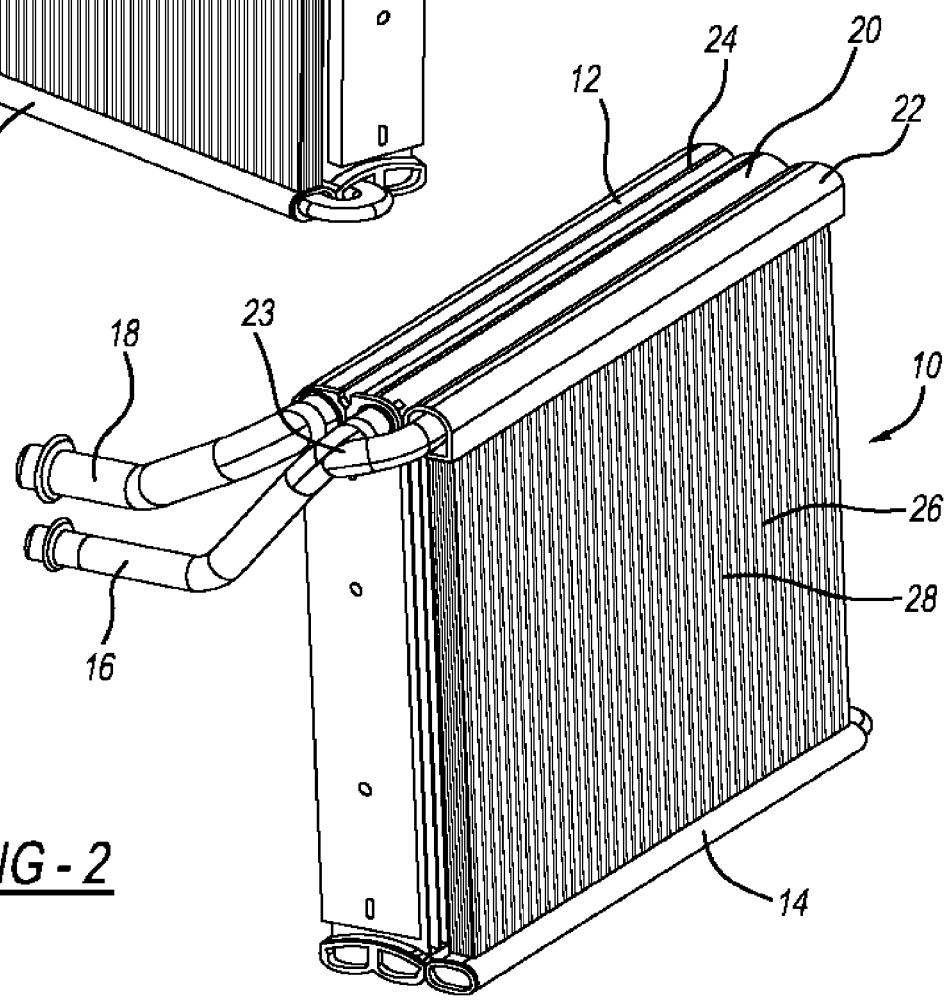
FIG. 2 is also an isometric view of the storage evaporator of FIG. 1 but taken from a different perspective in which the fluid flow tubes are illustrated.

Referring to FIGS. 1 through 6, a general arrangement for the add-on version of a storage evaporator according to the disclosed inventive concept is illustrated. With particular reference to FIGS. 1 and 2, a storage evaporator 10 is illustrated. The overall shape and size of the storage evaporator 10 illustrated herein is meant to be suggestive only and is not intended as being limiting, as other shapes and sizes may be suitable as well.

The storage evaporator 10 includes an upper tank assembly 12 and a lower tank assembly 14. The upper tank assembly 12 and the lower tank assembly 14 are typically made of a metal, although other materials including polymerized materials may be used alone or in combination. A lower pressure, inlet refrigerant input 16 is provided as is a lower pressure, outlet gas refrigerant output 18. The refrigerant flowing into the evaporator is typically a two-phase flow as opposed to a liquid state. On the other hand, the outlet of the evaporator may be either two-phase flow or in the gaseous state, depending on the application. The inlet refrigerant input 16 is connected to liquid input upper tank portion 20 and inlet input upper tank portion 22 by a branch 23. The outlet refrigerant output 18 is connected to an outlet output upper tank portion 24.

A series of refrigerant-containing tubes 26 fluidly connect the upper tank assembly 12 and the lower tank assembly 14. Positioned between the refrigerant-containing tubes 26 are phase change material-containing tubes 28. The phase change material-containing tubes 28 may be made from one or more of several materials, including a polymerized material (such as polypropylene or polyamide), a metal, ceramic, or any other material suitable for this purpose. FIGS. 5 and 6 illustrate a first embodiment of the phase change material-containing tubes in which the long axis of the phase change material-containing tubes 28 has a non-linear shape whereby gaps are alternatingly formed between the adjacent phase change material-containing tubes 28 themselves and the adjacent walls of the refrigerant-containing tubes 26. The phase change material-containing tubes 28 are themselves fin-shaped, adding to overall system cooling efficiency.

While the shape of the phase change material-containing tubes 28 is shown in FIGS. 5 and 6, it is to be understood that, regardless of the particular shape, the phase change material-containing tubes 28 are fin-shaped. This is also the case for the shapes of the phase change material-containing tubes shown in FIGS. 7 and 8 and also in FIGS. 9 and 10.

The fin-shaped configuration allows these tubes to additionally function as cooling fins, thus avoiding the need for separate fins as is currently known.

Referring to FIGS. 7 and 8, a second embodiment of the phase change material-containing tube construction is illustrated. According to this embodiment, a series of plenums 30 is illustrated in cross-section next to adjacent refrigerant-containing tubes 26. Each plenum 30 includes a first PCM-filled half 31 and a PCM-filled second half 32. The first half 31 and the second half 32 are joined by brazing or other joining techniques as are known in the art. The joined first half 31 and second half 32 define a series of six-sided, axially-formed air passageways 34. The outer walls of the first half 31 and the second half 32 are in direct contact with a portion of outer walls 36 of the adjacent refrigerant-containing tubes 26. The plenums 30 are formed from sheets of a stamped material, such as aluminum, that is formed together, thus defining the spaced apart walls that form the hollow, phase change material-containing walls. The plenums 30 are substantially shaped to act as fins where the cooling air flows through the axially-formed air passageways 34, thereby eliminating the need for conventional cooing fins in this area.

Figure 9A:
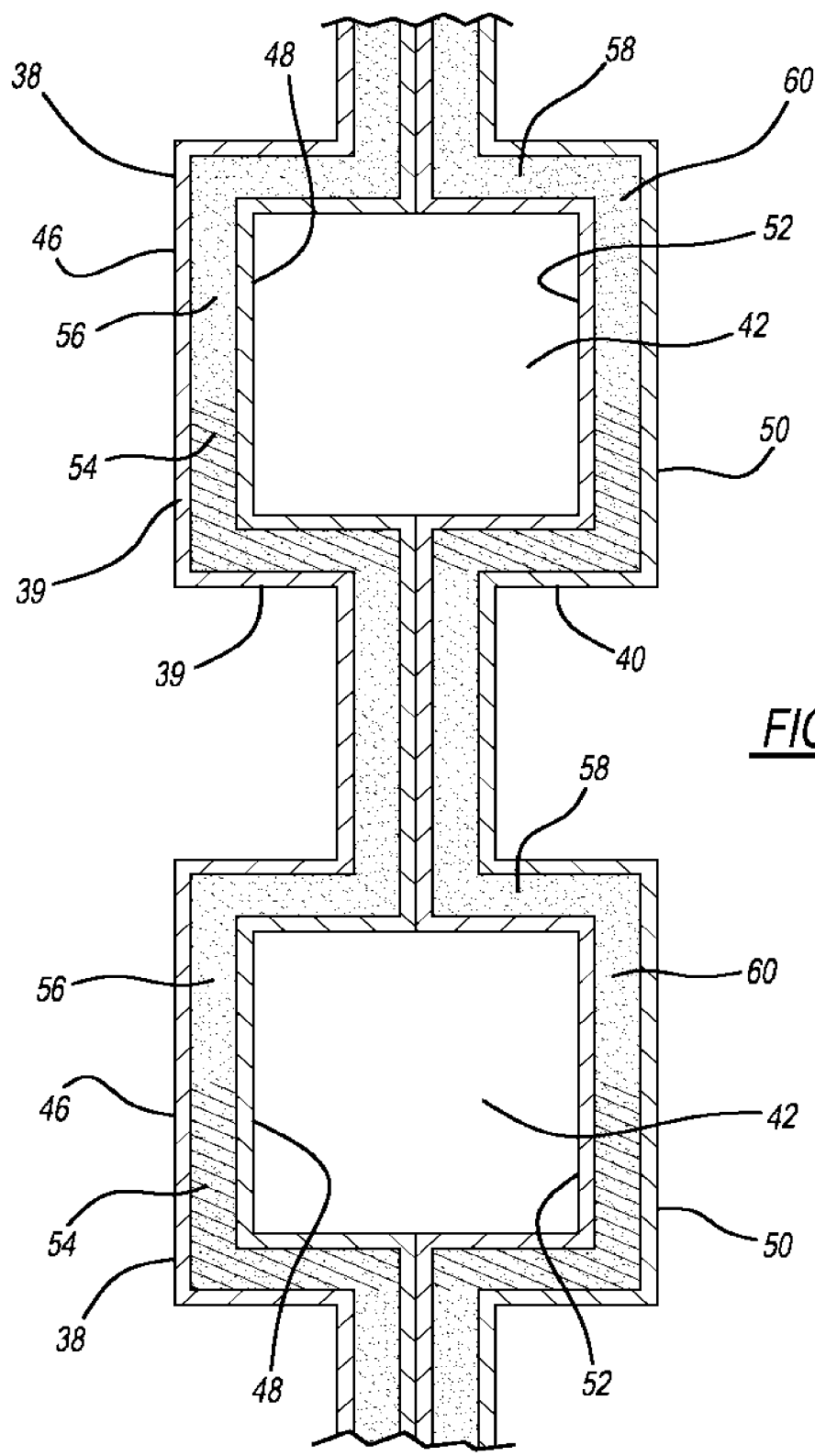
FIG. 9A is a sectional view of a pair of adjacent refrigerant-containing tubes.

Referring to FIGS. 9, 9A and 10, a third embodiment of the phase change material-containing tube construction is illustrated. According to this embodiment, a series of plenums 38 is illustrated in cross-section next to adjacent refrigerant-containing tubes 26. Each plenum 38 includes a first PCM-filled half 39 and a PCM-filled second half 40. The first half 39 and the second half 40 are joined by brazing or other joining techniques as are known in the art. The joined first half 39 and second half 40 define a series of four-sided, axially-formed air passageway 42, thereby functioning as a cooling fin and thus avoiding the need for additional cooling fins. The plenums 38 are formed from sheets of a stamped material, such as aluminum, that are formed together, thus defining the spaced apart walls that form the hollow, phase change material-containing walls.

As illustrated in FIG. 9A, the plenums 38 and the first PCM-filled half 39 includes an outer wall 46 and an inner wall 48. The second PCM-filled half 40 includes an outer wall 50 and an inner wall 52. A phase change material-containing area 54 in which phase change material 56 is contained is formed between the outer wall 46 and the inner wall 48 of the first half 39. A phase change material-containing area 58 in which phase change material 60 is contained is formed between the outer wall 50 and the inner wall 52 of the second half 40. As illustrated in FIG. 9A, the outer wall 46 of the first half 39 is in contact with a portion of the outer wall 36 of the adjacent refrigerant-containing tube 26. In the same way, the outer wall 50 of the second half 40 is in contact with a portion of the outer wall 36 of another adjacent refrigerant-containing tube 26.

Referring to FIGS. 11 through 13, a general arrangement for an integrated version of a storage evaporator according to the disclosed inventive concept is illustrated. It is to be understood that the overall shape and size of the storage evaporator 70 illustrated herein is meant to be suggestive only and is not intended as being limiting, as other shapes and sizes may be suitable as well.

The storage evaporator 70 includes a main evaporator 72 and a PCM-containing portion 74. A refrigerant inlet tube 76 is connected to an upper inlet tank 78 while a refrigerant outlet tube 80 is connected to an upper outlet tank 82. A lower tank assembly 84 connects the main evaporator 72 to the PCM-containing portion 74.

The PCM-containing portion 74 includes a series of refrigerant-containing tubes 86 that fluidly connect the upper outlet tank 82 to the lower tank assembly 84. Positioned between the refrigerant-containing tubes 86 are phase change material-containing tubes 88. As with the add-on embodiment of the disclosed inventive concept discussed above, the phase change material-containing tubes 88 may be made from one or more of several materials, including a polymerized material (such as polypropylene or polyamide), a metal, ceramic, or any other material suitable for this purpose. The structures of the phase change material-containing tubes 88 may be the same as those structures illustrated in FIGS. 7 through 10 and discussed in conjunction therewith.

In operation, when the air conditioning compressor is "on," the phase change material is cooled as is known in a common refrigeration process. However, when the air conditioning compressor is "off" (as is typically the case in a start/stop vehicle), the phase change material releases its cold energy to cool the incoming air, thus providing air conditioning to a vehicle in an efficient and cost-effective manner.

The disclosed inventive concept offers several advantages over the prior art, including, but not limited to, ease of addition to known fin and tube evaporator designs (whereby tooling costs are significantly reduced), avoidance of the need for additional fins since the phase shape material-containing tubes are already shaped like fins, and a more effective heat transfer because the phase change material has much larger heat exchange surface areas relative to the incoming air to be conditioned. For these and other reasons, the disclosed inventive concept of a storage evaporator provides superior performance at a lower cost when compared with known systems.

While the preferred embodiments of the disclosed inventive concept have been discussed are shown in the accompanying drawings and are set forth in the associated description, one skilled in the art will readily recognize from such discussion and from the accompanying drawings and claims that various changes, modifications and variations can be made therein without departing from the true spirit and fair scope of the invention as defined by the following claims.

What is claimed is:

1. A method for air conditioning a vehicle comprising the steps of:

forming an air conditioning system having a compressor and a storage evaporator, said compressor being switchable between on and off conditions, said evaporator including an upper coolant tank and a lower coolant tank spaced apart in a longitudinal direction, refrigerant tubes fluidly connecting said upper and lower tanks, and phase change material-containing tubes provided in contact with said refrigerant tubes, said phase change material-containing tubes including a first half that includes an inner wall and an outer wall defining a first channel for containing a phase change material, a second half including an inner wall and an outer wall defining a second channel for containing a phase change material, a first plurality of axially formed air passageways defined by and formed between said inner walls of said first half and said second half and spaced apart in the longitudinal direction, a second plurality of axially formed air passageways defined by and formed between said outer wall of said first half and an adjacent refrigerant tube and spaced apart in the longitudinal direction, and a third plurality of axially formed air passageways defined by and formed between said outer wall of said second half and an adjacent refrigerant tube and spaced apart in the longitudinal direction;

storing energy in said phase change material when said compressor is in an on position; and releasing energy from said phase change material when said compressor is in said on position.

2. The method of air conditioning a vehicle of claim 1 wherein the phase change material-containing tubes are air conditioning fins.

3. The method of air conditioning a vehicle of claim 1 wherein said refrigerant tubes have flat sides and said phase change material-containing tubes have flat sides, said flat sides of said refrigerant tubes being attached to said flat sides of said phase change material-containing tubes.

4. The method of air conditioning a vehicle of claim 1 wherein said phase change material-containing tubes have a cross-sectional shape, said cross-sectional shape being six-sided.

5. The method of air conditioning a vehicle of claim 1 wherein said phase change material-containing tubes have a cross-sectional shape, said cross-sectional shape being four-sided.

6. The method of air conditioning a vehicle of claim 1 wherein said phase change material-containing tubes are disposed parallel with one another in the longitudinal direction.

7. The method of air conditioning a vehicle of claim 6 wherein said phase change material-containing tubes are attached to one another in said longitudinal direction.

8. The method of air conditioning a vehicle of claim 1 wherein said phase change material-containing tubes are formed from stamped sheets.

9. The method of air conditioning a vehicle of claim 8 wherein said phase change material-containing tubes are formed from four stamped sheets, said four stamped sheets defining the first half that includes the inner wall and the outer wall and the second half that includes the inner wall and the outer wall.

10. The method of air conditioning a vehicle of claim 9 wherein said phase change material-containing tubes have axially-formed air passageways formed therein.

11. A method for air conditioning a vehicle comprising the steps of:

forming an air conditioning system having a compressor and a storage evaporator, said compressor being switchable between on and off conditions, said evaporator including a first coolant tank and a second coolant tank spaced apart in a longitudinal direction, refrigerant tubes fluidly connecting said first and second tanks, and phase change material-containing tubes provided in contact with said refrigerant tubes, said phase change material-containing tubes including a first half that includes an inner wall and an outer wall defining a first channel for containing a phase change material, a second half including an inner wall and an outer wall defining a second channel for containing a phase change material, a first plurality of axially formed air passageways defined by and formed between said inner walls of said first half and said second half and spaced apart in the longitudinal direction, a second plurality of axially formed air passageways defined by and formed between said outer wall of said first half and an adjacent refrigerant tube and spaced apart in the longitudinal direction, and a third plurality of axially formed air passageways defined by and formed between said outer wall of said second half and an adjacent refrigerant tube and spaced apart in the longitudinal direction;

storing energy in said phase change material when said compressor is in an on position; and releasing energy from said phase change material when said compressor is in said on position.

12. The method of air conditioning a vehicle of claim 11 wherein the phase change material-containing tubes are air conditioning fins.

13. The method of air conditioning a vehicle of claim 11 wherein said refrigerant tubes have flat sides and said phase change material-containing tubes have flat sides, said flat sides of said refrigerant tubes being attached to said flat sides of said phase change material-containing tubes.

14. The method of air conditioning a vehicle of claim 11 wherein said phase change material-containing tubes have a cross-sectional shape, said cross-sectional shape being six-sided.

15. The method of air conditioning a vehicle of claim 11 wherein said phase change material-containing tubes have a cross-sectional shape, said cross-sectional shape being four-sided.

16. The method of air conditioning a vehicle of claim 11 wherein said phase change material-containing tubes are disposed parallel with one another in the longitudinal direction.

17. The method of air conditioning a vehicle of claim 16 wherein said phase change material-containing tubes are attached to one another in said longitudinal direction.

18. The method of air conditioning a vehicle of claim 11 wherein said phase change material-containing tubes are formed from stamped sheets.

19. The method of air conditioning a vehicle of claim 18 wherein said phase change material-containing tubes are formed from four stamped sheets, said four stamped sheets defining the first half that includes the inner wall and the outer wall and the second half that includes the inner wall and the outer wall.

20. The method of air conditioning a vehicle of claim 19 wherein said phase change material-containing tubes have axially-formed air passageways formed therein.

* * * * *